United States Patent
Frison et al.

(10) Patent No.: US 11,266,076 B2
(45) Date of Patent: Mar. 8, 2022

(54) LIGHTING DEVICE AND A METHOD OF DISTRIBUTING LIGHT RADIATION SOURCES

(71) Applicant: OSRAM GmbH, Munich (DE)

(72) Inventors: Renato Frison, Chions (IT); Xiaolong Li, Montebelluna (IT)

(73) Assignee: FLUENCE BIOENGINEERING, INC., Austin, TX (US)

( * ) Notice: Subject to any disclaimer, the term of this patent is extended or adjusted under 35 U.S.C. 154(b) by 0 days.

(21) Appl. No.: 16/966,010

(22) PCT Filed: Jan. 21, 2019

(86) PCT No.: PCT/IB2019/050484
§ 371 (c)(1),
(2) Date: Jul. 30, 2020

(87) PCT Pub. No.: WO2019/150223
PCT Pub. Date: Aug. 8, 2019

(65) Prior Publication Data
US 2020/0355351 A1   Nov. 12, 2020

(30) Foreign Application Priority Data

Jan. 31, 2018 (IT) .................. 102018000002273

(51) Int. Cl.
*A01G 7/04* (2006.01)
*F21V 19/00* (2006.01)
(Continued)

(52) U.S. Cl.
CPC ............ *A01G 7/045* (2013.01); *F21V 19/001* (2013.01); *F21V 23/003* (2013.01); *H05B 45/20* (2020.01);
(Continued)

(58) Field of Classification Search
CPC ...... F21V 19/001; F21V 23/003; A01G 7/045
(Continued)

(56) References Cited

U.S. PATENT DOCUMENTS 7,348,723 B2   3/2008   Yamaguchi et al.
8,382,338 B2 *  2/2013   Lee .......................... F21V 5/04
                                              362/311.06
(Continued)

FOREIGN PATENT DOCUMENTS

| EP | 2761988 A1 | 8/2014 |
|---|---|---|
| EP | 2761995 A1 | 8/2014 |
| WO | 2017134623 A1 | 8/2017 |

OTHER PUBLICATIONS

International Search Report for the corresponding PCT Application No. PCT/IB2019/050484 (14 pages) dated Apr. 2, 2019 (for reference purpose only).

*Primary Examiner* — Bryon T Gyllstrom
(74) *Attorney, Agent, or Firm* — Viering, Jentschura & Partner MBB

(57) ABSTRACT

A lighting device may have a planar array of electrically-powered light radiation sources partitioned into a plurality of sets of light radiation sources. The light radiation sources of the same set may emit light radiation of the same color, and different sets of radiation sources may emit light radiation of different colors. Each one of the different sets of light radiation sources may include a respective fraction of the total number of light radiation sources in the array. The light radiation sources have respective planar coordinates relative to a common center of the array, and the different sets of light radiation sources have respective centers located at the common center. The array comprises at least two complementary sub-arrays, opposite to the common center. The different sets of radiation sources are present in the sub-
(Continued)

arrays in respective partial fractions of the number of radiation sources included in the sub-array.

16 Claims, 3 Drawing Sheets

(51) Int. Cl.
*F21V 23/00* (2015.01)
*H05B 45/20* (2020.01)
*F21Y 105/16* (2016.01)
*F21Y 113/10* (2016.01)
*F21Y 115/10* (2016.01)

(52) U.S. Cl.
CPC ....... *F21Y 2105/16* (2016.08); *F21Y 2113/10* (2016.08); *F21Y 2115/10* (2016.08)

(58) Field of Classification Search
USPC .......................................... 362/231
See application file for complete search history.

(56) References Cited

U.S. PATENT DOCUMENTS

| | | | |
|---|---|---|---|
| 9,820,447 B2* | 11/2017 | Vilgiate | H05B 47/19 |
| 2012/0170264 A1* | 7/2012 | McKenzie | A01G 7/045 |
| | | | 362/231 |
| 2013/0293156 A1* | 11/2013 | Wells | F21V 29/502 |
| | | | 315/312 |
| 2016/0353671 A1* | 12/2016 | Shaughnessy | A01G 7/045 |
| 2017/0245440 A1* | 8/2017 | Cho | F21V 3/00 |

* cited by examiner

LIGHTING DEVICE AND A METHOD OF DISTRIBUTING LIGHT RADIATION SOURCES

CROSS-REFERENCE TO RELATED APPLICATIONS

The present application is a national stage entry according to 35 U.S.C. § 371 of PCT application No.: PCT/IB2019/050484 filed on Jan. 21, 2019; which claims priority to Italian Patent Application Serial No.: 102018000002273 filed on Jan. 31, 2018; all of which are incorporated herein by reference in their entirety and for all purposes.

TECHNICAL FIELD

The description refers to lighting devices.

One or more embodiments may refer to lighting devices using electrically-powered light radiation sources, for example solid-state light radiation sources such as LED sources.

One or more embodiments may be used in horticultural applications (cultivation of plants and flowers), for example, in domestic contexts. The reference to this possible application context should not be taken as limitative of the embodiments

BACKGROUND

In installations using solid-state lighting systems, such as those for horticultural uses (even in domestic settings) in situations, where lighting points may be distributed (as is the case, for example, in the case of shelves for "vertical" horticultural installations), the installation project aims to meet similar needs to those arising in general lighting applications. This applies, for example, to the desirable containment of costs in connection with the production of a good lighting distribution, for example, on rectangular surfaces.

In horticultural applications, the situation is made more complex by using light radiation sources with different emission spectra (for example, several different types of LEDs), grouped and controlled independently. This can make the achievement of a uniform distribution critical, both at the colour level and at the lighting level (for example, at the lighting level of the lighted surface).

One solution that can be adopted in such a context is that of using one or more arrays, each comprising a distribution of light radiation sources (LEDs, to refer to an example to which reference will be constantly made below). The or each array may comprise different types of LEDs, with the possibility of obtaining uniform illuminance using a single optic for each LED, or a single optic (for example, a reflector) for each group or cluster of LEDs, so as to achieve a shaping action of the distribution of light radiation towards the lighted surface (for example, rectangular).

These arrays of associated LEDs and/or optics can be reproduced and coupled with other arrays of LEDs and/or optics so as to cover a larger area.

There are lenses known in the art that are able to provide an output light emission distribution able to uniformly illuminate a flat surface. For example, lenses of this nature can be used in backlighting applications, for example, to create a flat and uniform lighting field on the front surface of a liquid crystal display (LCD) of the type used, for example, in television screens, computers, smartphones or tablets.

The documents U.S. Pat. No. 8,382,338 B2 or U.S. Pat. No. 7,348,723 B2 provide examples of asymmetric lenses that can be used to provide uniform lighting of a planar display.

The previous Italian patent application 102017000067055, assigned to the same Assignees of the present application, and not yet accessible to the public at the time of filing the present application, illustrates examples of lenses of this nature.

Solving problems related to the distribution of illuminance and/or colour on the lighted surface does not—in itself—solve the associated problem of choosing and mixing the colour distributions at the level of the various light radiation sources (for example LEDs) used.

For example, in a horticultural application context, it is desirable to be able to provide plants with a necessary amount of light radiation both at the flow level ($\mu mol/s/m^2$) and in terms of spectrum.

LED sources do not generally have a sufficiently wide emission spectrum for a single source type to be able to satisfy this need. In these applications, different sets of LEDs are used, with the LEDs included in each set emitting the same type (colour) of light radiation, and with the various different sets emitting different types (colour) of light radiations.

It is therefore desirable to be able to arrange the light radiation sources in (at least) one array on a support such as, for example, a printed circuit board (PCB), avoiding that a certain portion of the reference plane is only struck by a certain limited portion of flow or colour.

SUMMARY

One or more embodiments aim to contribute to providing improved solutions able to overcome the drawback outlined above.

According to one or more embodiments, this object can be achieved thanks to a lighting device having the characteristics referred to in the following claims.

One or more embodiments may concern an installation (for example, for horticultural use), as well as a corresponding method.

The claims form an integral part of the technical disclosure provided here in relation to the embodiments.

One or more embodiments may make it possible to achieve one or more of the following advantages:

greater energy efficiency achieved through the choice of the combination of colours of the light radiation sources, greater uniformity in terms of colour and illuminance on the control plane thanks to the choice of the positions of the individual light radiation sources, containment of overall costs, linked, for example, to the use of a reduced number of light radiation sources, reduction of the costs of mechanical components, thanks to the possibility of using standard coupling solutions, for example, at the level of lenses and LEDs, possibility of producing an additional action to adjust the distances of each colour of the light radiation sources with respect to the side walls of the installation, with the possibility of further improving the distribution in terms of colour and illuminance, possibility of "customizing" the choice of colours of the light radiation sources, possibly taking into account different reflectivity characteristics of the side walls of the installation, still with the scope of achieving colour and illuminance uniformity, possibility of also pursuing this purpose with an action of misalignment of some light radiation sources with respect to a completely regular array as applied, for example, on a support such as a printed circuit board (PCB).

BRIEF DESCRIPTION OF THE FIGURES

In the following, various non-limiting embodiments are explained in more detail in conjunction with the associated figures.

Identical, similar or equivalently functioning elements are labelled with the same reference signs in the figures. The figures and the relative proportions of the elements represented in the figures are not to be considered to be true to scale. Instead, individual elements may be shown exaggerated in size for ease of visualization and/or better understanding.

DETAILED DESCRIPTION

The following description illustrates various specific details in order to provide a thorough understanding of various examples of embodiments according to the description. The embodiments can be obtained without one or more of the specific details, or with other methods, components, materials, etc. In other cases, known structures materials or operations are not illustrated or described in detail so that the various aspects of the embodiments and not rendered unclear.

The reference to "an embodiment" in the context of the present description indicates that a particular configuration, structure or characteristic described in relation to the embodiment is included in at least one embodiment. Thus, sentences such as "in an embodiment", which may be present at various points in the present description do not necessarily refer to exactly the same embodiment. Moreover, particular configurations, structures or characteristics can be combined in any suitable way in one or more embodiments.

The references used here are provided simply for convenience and therefore do not define the field of protection or scope of the embodiments.

Figure 1:
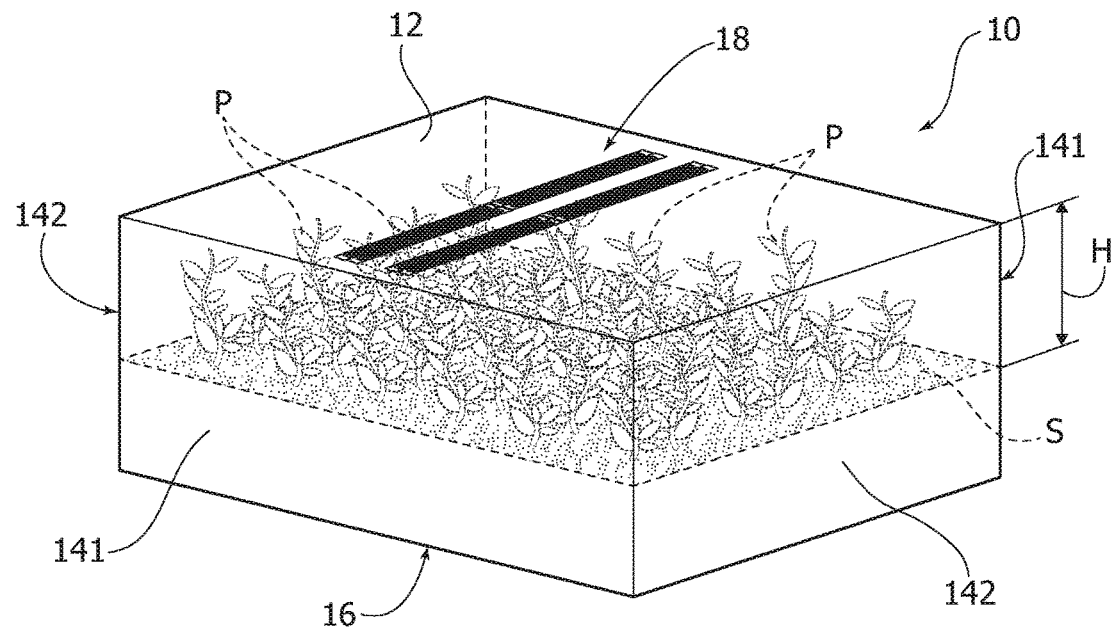
FIG. 1 is a perspective view that exemplifies a possible context of use of one or more embodiments, FIG. 2 exemplifies general criteria that can be used in implementing embodiments, FIG. 3 exemplifies a possible mechanism for determining the distribution of light radiation sources in one or more embodiments, FIG. 4 exemplifies a possible distribution of radiation sources according to embodiments, FIG. 5 comprises four portions, indicated respectively by a), b), c) and d), which exemplify possible distributions of radiation sources on a substrate, and FIG. 6 exemplifies, in the form of a flow diagram, possible ways of implementing embodiments.

FIG. 1 illustrates (according to methods substantially similar to those adopted in Italian patent application 102017000067055, already mentioned above) possible characteristics of a lighting installation usable, for example, in horticultural applications to promote plant growth.

In one possible embodiment, the installation 10 may comprise a parallelepiped space capable of presenting, for example, dimensions in the order of 500 mm (length)×400 mm (width)×200 mm (height). The quantitative values presented here, of course, merely represent a non-limiting example of the embodiments.

In one or more embodiments, such a space can be defined, for example, as a "cabinet" or cassette or culture box in which plant culture material (e.g. soil for planting) can be arranged.

As exemplified in FIG. 1, such a cabinet may therefore comprise:
- an upper wall (or "ceiling") 12,
- a first pair of (main) sides or walls 141, opposite and parallel to each other,
- a second pair of sides or walls (minor) 141, opposite and parallel to each other,
- a back wall 16.

The installation exemplified in FIG. 1 may comprise one or more arrays 18 (for example, of linear- or matrix-type) of electrically-powered light radiation sources (for example, solid state light radiation sources, such as LED sources) mounted on the upper wall of the "cassette" so as to project the light radiation from top to bottom on the culture plane, indicated with S, in which plants P may be present.

The plane S (at which illumination that is as uniform as possible is desired) extends substantially parallel to the bottom wall 16 of the cassette, for example, at a distance H in the order of 120 mm from the upper surface 12: in this case as well, this is a purely exemplifying value, not a limitation of the embodiments.

The array or arrays 18 of light radiation sources (to simplify illustration hereinafter, reference will be made to the presence of a single array, comprising, for example, two rows or lines of sources placed side-by-side) can be located at the central area of the upper wall 12 so as to illuminate the surface S from above starting from a central position.

In one or more embodiments, and operating according to criteria known per se, controlled environmental conditions (for example, in terms of humidity and temperature) can be maintained in the cassette, to which a lighting effect can be added, which should be as uniform as possible, both in terms of illuminance and colour, particularly at the plane S.

The previous Italian patent application, already cited above, aims to achieve this result in particular concerning the action of lenses that can be associated with the light radiation sources in the array 18, with the ability to take into account the fact that the side walls of the cassette may be reflective, so as to send the light radiation coming from the aforesaid light radiation sources towards the plane S.

One or more embodiments address the aspect of distribution of the light radiation sources (from now on, reference will be made to LED sources for simplicity, without this being interpreted in a limiting sense of the embodiments) within the array 18, with particular attention to achieving results of colour and illuminance uniformity, as a function of expressible objectives in terms of power level (or "wattage", expressed in μmol/s/m$^2$), spectrum, number of LEDs used, driving currents and positioning of LEDs.

One or more embodiments are related to a possible "numerical" scheme which can be used to determine the location of the various LEDs within the array in which they are inserted.

Of course, one or more embodiments can be used in combination (synergistically) with the exemplified solution in the Italian patent application already mentioned above, in particular regarding the possibility of using asymmetric lenses of the "free-form" type. In this way, it is possible to aim for the obtainment of, for example, an illuminance distribution that decreases gradually so as to take into account the reflection effects of the light radiation on the side walls of the installation, so that Lambertian reflectivity characteristics can be (reasonably) assumed with a reflectivity value of, for example, 85%. Of course, this value (as well as the different quantitative values mentioned above) is purely exemplary and not limitative.

Figure 2:
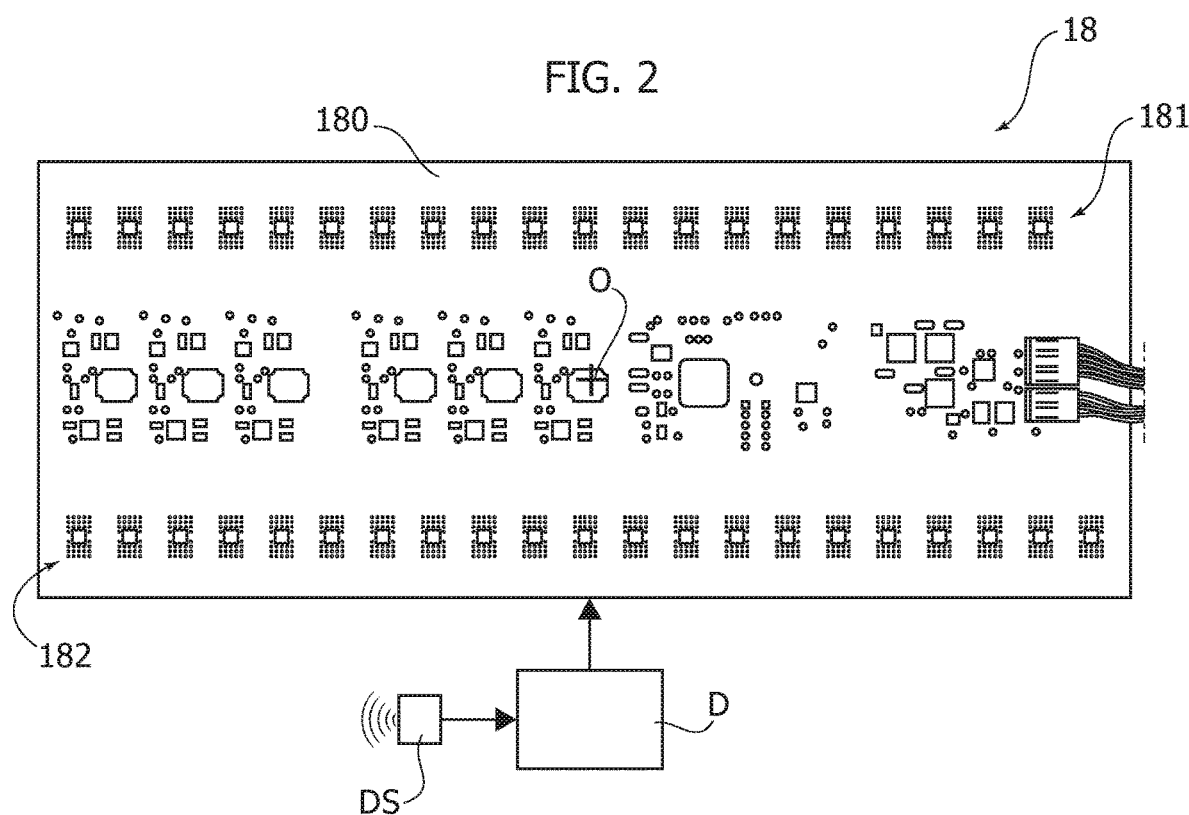

FIG. 2 is a plan view (from below, with reference to the observation point of FIG. 1) of an array 18 comprising, for example, two parallel rows or lines 181, 182 of LEDs (it will be recalled again that the reference to LED sources is essentially made for simplicity and synthesis, without limiting intent of the embodiments) comprising, for example, 20 LEDs (row 181, top) and 21 LEDs (row 182, bottom) for a total of 41 LEDs.

Once again, these values (as well as the presence of different numbers of LEDs in the two rows) are only examples, which do not have a limiting value for the embodiments. This is also in consideration of the fact that, for example, the choice of using different numbers of LEDs in the two rows 181 and 182 can derive from considerations of a design nature, for example, linked to the location of the sources 181, 182 on a relative planar support (for example PCB) 180.

In one or more embodiments, the LEDs of the array 18 can be of the same type (i.e. belong to the same "family"), but have, however, different emission characteristics, in particular, regarding the spectrum.

For example, according to a solution usable in horticultural applications, it is possible to envisage the presence of four sets or groups of sources belonging to four sets of LEDs in which LEDs of the same set emit light radiation of the same colour, while different sets emit different coloured light radiations.

For example, there may be four sets of LEDs emitting, respectively:
blue radiation (around 450 nm),
red radiation (660 nm),
deep red radiation (around 730 nm),
white radiation (which may be cold white light, CCT=5600-6500° K, e.g. around 5700° K, so as to have a greater component of green light, beneficial for the growth of plants).

The choice, referred to here purely by way of example, of these colours (in terms of number and characteristics) can be linked to considerations inherent in facilitating the growth of plants.

As already stated, these considerations correspond to the application of knowledge and criteria known per se, so as not to require a detailed description here.

The possible presence of a set of sources emitting white light (overall broad spectrum with a peak in the blue region of around 450 nm, and a broader spectrum in the green/yellow region resulting from the conversion action carried out via phosphors) can be linked to different factors.

For example, as already mentioned, it has been found that the presence of a green component (500-550 nm) can be beneficial for plant growth.

Furthermore, the presence of white radiation sources can be useful when inspecting the box.

For example, the array of light sources 18 can be subjected (according to criteria known per se) to the control by a drive unit D. In one or more embodiments, a momentary deactivation function can be integrated in the unit D for the light radiation sources that do not emit white light (for example, a DS sensor that detects the opening of the box), allowing observation of the plants P illuminated by white light (with the other sources deactivated). This avoids having to observe the plants in conditions where vision would be altered, in particular regarding the colour of the plants, by lighting with blue and red sources.

Figure 6:
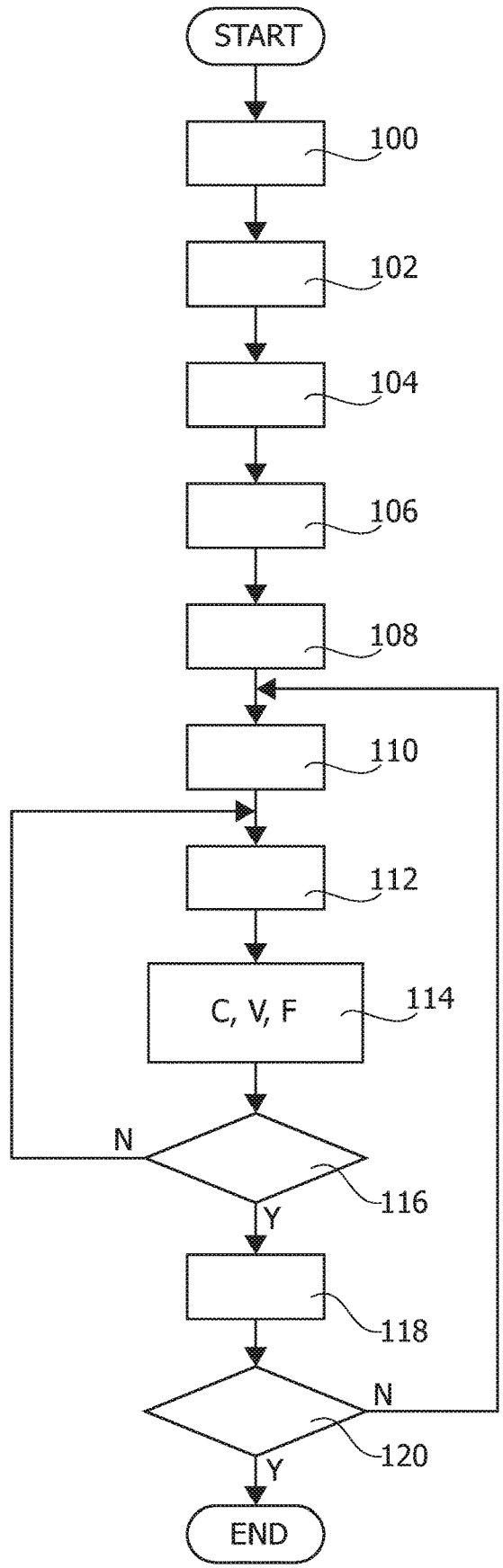

Referring from now on to the flow diagram of FIG. 6 for convenience, a first action 100 in determining the characteristics of the array of sources 18 can be represented by the choice of light radiation colours that are required (with reference to the example made previously: blue, red, deep red, white).

In a subsequent action 102, it is then possible to proceed to the study/analysis of the characteristics of the single types of sources (LEDs). This can be done, for example, on the basis of experimental data reported on the relative datasheets, or rather, using a mathematical model obtained from this data, so as to obtain information on the emission characteristics of the various types of LEDs.

For example, it is possible to evaluate the flow emitted for different driving currents (e.g. at a temperature of 25° C.) and/or at different temperatures (e.g. for a given driving current value).

If a mathematical model is used, it is possible to use a linear polynomial interpolation so as to be able to extrapolate the flow values for different currents and/or temperatures.

On the basis of this data (and operating according to criteria known per se), in an action 104 it is possible to identify a total number N and respective numbers N1, N2, . . . of sources of the various colours (therefore in the various sets) so as to allow the required performance for the installation to be obtained.

For example (of course the following considerations are purely exemplary and not limitative of the embodiments), it is possible to observe that solid-state sources such as LED sources can operate under favourable conditions with a temperature (at the welding level) of around 60° C. (or less). This is a value close to the peak value of the efficiency of the complete system, with a current supply of 350 mA, which can represent a satisfactory compromise in terms of consumption and functionality.

Once these working conditions have been identified, it is possible to convert the radiometric power values of each (type of) LED in terms of the respective flow value in $\mu mol/s/m^2$, e.g. applying the following relations:

$$\text{energy of a photon} = h*\upsilon = h*c/\lambda$$

$$\text{number of photons} = \text{total energy/energy of a photon} = \text{total energy}*\lambda/(h*c)$$

$$\text{photonic flux } [\mu mol/m^2/s] = \text{number of photons}/(Na*\text{Area}).$$

wherein:
h is Planck's constant,
c is the speed of light,
$\lambda$ is the emission wavelength (in the case of an approximate calculation we can refer to the central value of the spectrum),
the total energy is the radiometric flow value of the source (LED),
Na is Avogadro's constant,
"Area" is the area of the control plane (i.e. the surface to be lighted S).

In choosing the number of LEDs included in each set of the array in order to achieve a required flow value—in conjunction with the required relative presence levels of the various colours blue, red, deep red, white—it is possible to operate according to (known types of) considerations linked to the application (for example, horticultural), with the possibility of also envisaging possible adaptations of the power supply currents.

For example, the table reproduced below exemplifies possible choices of the number of LEDs in various groups of LEDs which, referring to the above example, emit respective red, blue, deep red and white light radiations.

| Total number of LEDs | Red | Blue | Deep red | White |
|---|---|---|---|---|
| 41 | 15 | 7 | 11 | 8 |
| 37 | 13 | 7 | 10 | 7 |
| 49 | 9 | 15 | 12 | 13 |
| 50 | 10 | 15 | 12 | 13 |
| 51 | 11 | 15 | 12 | 13 |
| 52 | 12 | 15 | 12 | 13 |
| 53 | 13 | 15 | 12 | 13 |
| 54 | 14 | 15 | 12 | 13 |
| 55 | 15 | 15 | 12 | 13 |
| 56 | 16 | 15 | 12 | 13 |
| 57 | 17 | 15 | 12 | 13 |
| 58 | 18 | 15 | 12 | 13 |
| 59 | 19 | 15 | 12 | 13 |
| 60 | 20 | 15 | 12 | 13 |
| 61 | 21 | 15 | 12 | 13 |
| 62 | 22 | 15 | 12 | 13 |
| 63 | 23 | 15 | 12 | 13 |
| 64 | 24 | 15 | 12 | |

This choice can be made, as mentioned above (and operating according to criteria known per se) as a function of the respective total photonic flux values required for various current values (e.g. 200 mA, 300 mA, and so on).

For present purposes, it can be noted that this selection mechanism (however implemented) leads to identifying:
- the total number of light radiation sources (total number of LEDs—leftmost column in the table),
- the number of sources included in each set of sources that emit radiation of a certain colour (red, blue, deep red or white—successive columns in the table: remember once again that the choice of these colours and their number are not intended in a limiting sense).

The example presented in FIG. 2, in which there are in total N=41 sources, i.e. 20 sources in row 181 and 21 sources in row 182, can be seen as corresponding to the first row in the table, i.e. to a solution in which the following are present:
- N1=15 LEDs emitting red radiation,
- N2=7 LEDs emitting blue radiation,
- N3=11 LEDs emitting deep red radiation, and
- N4=8 LEDs emitting white radiation,
- with N1+N2+N3+N4=N=41 LEDs in total.

Starting from the subsequent action indicated by 106, one or more embodiments envisage implementing steps that can determine the possible distribution of the LEDs of various sets within the array 18.

Figure 3:
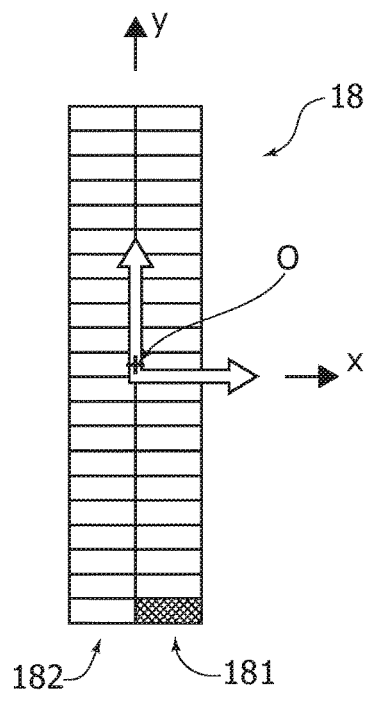

The operation of choosing the location of individual LEDs in the array 18 can be seen in terms schematically represented in FIG. 3, i.e. (if we want to refer to an array like the one represented in FIG. 2) as a filling operation of a table comprising two columns (corresponding to the two rows of LEDs 181 and 182 that can be seen in FIG. 2), which can be implemented taking into consideration the fact that one or more positions in the table (for example, the one on the bottom right of FIG. 3, and corresponding to the right-hand end in the row or line 181, comprising 20 LEDs—and not 21 like the row or line 182) may remain empty—or already be "filled" for various embodiment considerations.

For example, in the case of the table shown in FIG. 3, the left-hand column is intended to be filled in all 21 positions (21 LEDs in the row 182 of FIG. 2) while the right-hand column is intended to be filled in only 20 positions (row of LEDs 181 in FIG. 2).

Figure 4:
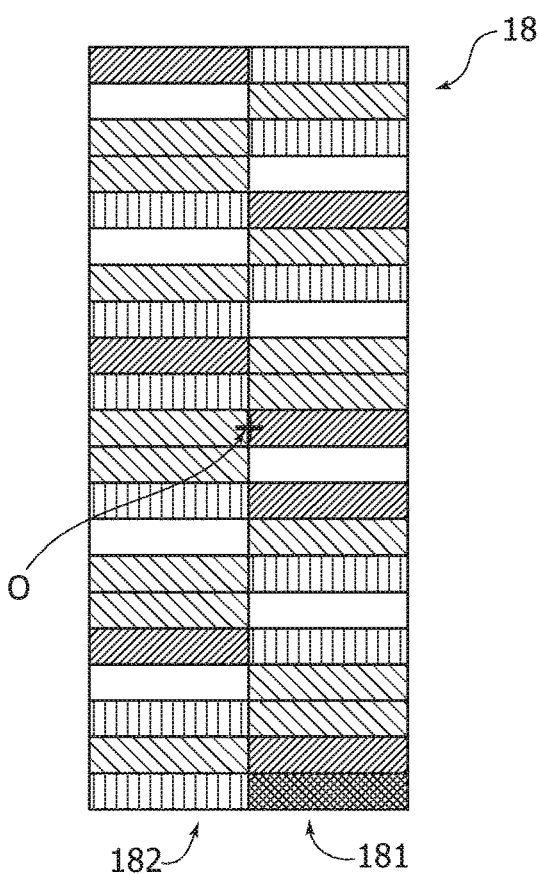

A possible outcome of such a filling operation is shown in FIG. 4, where, to compensate for the unavailability of colour representations, the different colours of the light radiation emitted by the various groups or sets of radiation sources are represented with different types of dashes.

In one or more embodiments the array/table can be seen as a planar-type array (applied on a support 180 such as a printed circuit board), in which it is possible to define a reference system (for example, x, y Cartesian) wherein the i-th light radiation box/source is identified with respective spatial coordinates ($x_i$ and $y_i$) with respect to a centre or origin 0 of the array, definable e.g. in geometrical terms as a function of the shape of the array or as the mean value of the coordinates $x_i$ and $y_i$ of all the sources i=1, . . . , N of the array (in the example considered here N=41).

It will be appreciated that such a representation is generally possible independent of the total number, dimensions and positions of the individual light radiation sources.

In one or more embodiments, the choice of the locations exemplified in the steps or actions from 106 onwards in the flow diagram of FIG. 6 can be implemented according to the criteria discussed below.

A first criterion is that the sources of each set or group are distributed in the array 18 in such a way that the various groups or sets of sources (in the case of the example considered here: the set of the N1 red sources, the set of the N2 blue sources, the set of the N3 deep red sources and the set of the N4 white sources) are substantially homocentric, with centres located at the centre or origin O of the array.

According to this criterion, the centres of the various groups or sets (each definable, for example, as the mean of the coordinates $x_i$, $y_i$ of the N1 red sources, of the N2 blue sources, the N3 deep red sources and the N4 white sources) are substantially or approximately coincident with each other and located at the centre or origin O of the array.

The fact of referring to "substantially" or "approximatively" coincident centres located "at" the centre O of the array takes into account the fact that, even assuming—for simplicity—that there are N=N1+N2+N3+N4 point sources, each identifiable in the plane of the substrate 180 (e.g. PCB) by a pair of coordinates $x_i$, $y_i$, the relative sets can be discrete sets of low cardinality (that is, capable of containing few elements), so that the relative means may not exactly coincide with each other, or rather coincide with each other only after rounding.

A second criterion aims to ensure that the variance of the coordinates of the sources included in each distribution set of the different colour sources N1, N2, N3, N4 is sufficiently high.

It has been verified that the fact of operating in accordance with this criterion allows prevention of sources of the same colour being grouped together in a certain portion (sub-region) of the array, for example, (referring to FIG. 3) avoiding that all the blue LEDs are placed on the lower left and the red LEDs on the upper right, and so on.

This criterion, inherent to variance, therefore aims to ensure that the various sources are distributed uniformly within the array 18, taking into account the fact that, as we have seen, the LEDs of different colours are present in different measures within the array of, for example, N=41 sources (with N1/N=15/41 LEDs emitting red radiation, N2/N=7/41 LEDs emitting blue radiation, N3/N=11/41 LEDs emitting deep red colour radiation, and N4/N=8/41 LEDs emitting white radiation).

A second criterion for distributing the light radiation sources according to one or more embodiments envisages that the array 18 can be divided into at least two mutually opposite sub-arrays (i.e. lying on opposite sides or bands) with respect to the origin or centre O of the array, ensuring that the sources of the various sets are uniformly distributed ("equal") in the various sub-arrays. This is achieved by ensuring that the aforesaid "total" presence fractions of the sources of the various groups on the total number of sources of the array, that is (in the case of the example cited here) N1/N=15/41, N2/N=7/41, N3/N=11/41 and N4/N=8/41 are reflected as closely as possible in each of the sub-groups.

For example, referring to FIG. 4, it can be assumed that the two sub-arrays adjoining each other at the origin O of the array simply correspond to the two columns 181 and 182 (see also FIG. 2).

It can then be verified that, respectively, in column 181 and in column 182, there are:
7/20 and 8/21 LEDs emitting red radiation,
4/20 and 3/21 LEDs emitting blue radiation,
5/20 and 6/21 LEDs emitting deep red radiation,
4/20 and 4/21 LEDs emitting white radiation.

On the basis of this second criterion, in each of the two sub-arrays the sources of the various groups are present in "partial" fractions, which reflect the aforesaid "total" fractions, in the sense that the partial fractions i) are substantially or approximately identical to each other in the various sub-arrays and ii) they are substantially or approximately identical to the respective total fraction which expresses the presence of the respective group in the total of the N sources of the array, i.e. (once again referring to the example presented here, which is as follows):
7/20≈2≈15/41 for the LEDs emitting red radiation,
4/20≈3/21≈7/41 for the LEDs emitting blue radiation,
5/20≈6/21≈11/41 for the LEDs emitting deep red radiation,
5/20≈6/21≈11/41 for the LEDs emitting white radiation, Once again, the fact of referring to values that are "substantially" (or "approximately") identical or coincident (see the symbol ≈ that repeatedly occurs above) aims to take into account the fact that the sets of N1, N2, N3 and N4 sources can be discrete sets of low cardinality (i.e. able to contain few elements), so that the relative means/fractions may not coincide exactly with each other, or rather coincide with each other only after rounding. This also depends on the possibility that the two sub-arrays do not include the same number of sources (for example, 20 and 21 in the case of the example considered here).

It will also be appreciated that an LED distribution, as exemplified in FIG. 4, satisfies the criterion outlined above (also) if, instead of corresponding to the two columns 180 and 181, the at least two sub-arrays mutually opposite each other at the origin O of the array are defined as corresponding to, e.g. the first 10 rows and the second 11 rows of the two columns (with the origin O, which is found in the 11th row from the top).

It has been observed that the two criteria outlined above facilitate maintenance of the relative relations between the various chromatic components, facilitating the achievement of a high level of uniformity in terms of colour and illuminance at the level of the surface S.

One or more embodiments, as exemplified here, may provide the additional criterion of avoiding symmetrical distributions of the sources in the various sub-arrays, which further facilitates the achievement of a level of homogeneity and illuminance and colour.

Limiting to the case of specular symmetry for simplicity (as an example of a possible type of symmetry), it will be noted that, for example, the distributions of the various sources in the two columns 181 and 182 of FIG. 4 are not specularly symmetrical with respect to the ideal vertical separation line of the two columns passing through the origin O, nor (a fortiori) with respect to an ideal horizontal line passing through the origin O.

It is also possible to verify that one or more embodiments can also satisfy the aforesaid criterion of absence of symmetry with respect to other forms of symmetry (translation, rotation, etc.) with respect to the origin or centre O.

One (or more) distributions of sources capable of satisfying the criteria outlined above can be identified by exploring the field of possible distributions (virtually all), and discarding the distributions that do not satisfy these criteria.

Although feasible, this solution can be demanding in terms of capacity and processing times in the presence of arrays 18 comprising a fairly high number N of sources.

The step 106 and successive steps of the flowchart of FIG. 6 exemplify a procedure that facilitates the search and identification of distributions of light radiation sources that can satisfy the criteria discussed above.

For example, the block 106 may correspond to the creation of a sequence of the various sources of the array 18 ordered with a sequence of respective colours, for example, of an alternate type (this choice, not imperative per se, has been shown to accelerate the rapid convergence of the procedure illustrated below), for example, B W R D B W R D B W R D B W R D W R D W R D R D, etc. in which each letter represents a colour (for example B=blue, W=white, R=red, D=deep red).

In an action 108 it is then possible to fill (for example, by operating in a pseudo-random manner) some positions of the representative table of the array (see, for example, FIG. 3), for example, by providing the presence of at least one source for each group or set.

It will be appreciated, however, that the table may already have some positions intended to remain empty (as already said previously for the box at the bottom right, intended not to be assigned) and/or positions already assigned for implementation requirements (for example, power supply tracks, etc.).

In an action 110 it is then possible to choose a colour in the sequence discussed above starting, for example, from the first position in the sequence (for example B=blue, in the considered case) that, in a step 112, is used to fill a first "free" position in the table.

In an action 114, for each group or set of sources that currently "populate" the table, the following are calculated:
a first value C that is a function of the coordinates $x_i$, $y_i$ of the sources included in a certain set or group (e.g. as a sum, possibly normalized, of the squares, along the x and y axes, of the average of the distances of the various sources of the group with respect to the (current) centre of the group),
a second value V that is a function of the variance of the aforesaid coordinates of the aforesaid sources with respect to this centre, and
a magnitude F, which can be expressed as:

$$F = l_1 C - l_2 V$$

as a function of parameters $l_1$ and $l_2$ (which can be defined as discussed below).

Block 116 in FIG. 6 exemplifies verification that the actions of blocks 112 to 114 have been performed for all free positions for a certain colour selected in step 110.

Following a negative outcome of the verification of block 116, steps 112 and 114 are repeated in relation to the remaining available free positions.

Following a positive outcome of the verification of block 116 (all the free positions for a certain colour chosen in step 110 have been "explored"), in an action 118 one chooses and assigns—for this colour—the position for which the lowest value of F has been calculated.

Block 120 in FIG. 6 exemplifies the verification that the entire sequence of colours defined in step 106 has been explored.

Following a negative result of the verification of block 120, steps 110 to 118 are repeated in relation to the remaining colours in the sequence.

A positive result of the verification of block 120 indicates that the sequence has been completely explored and that, consequently, all the positions of the array 181, 182 have been "filled" with corresponding light radiation sources, bringing the procedure to completion (END).

Figure 5:
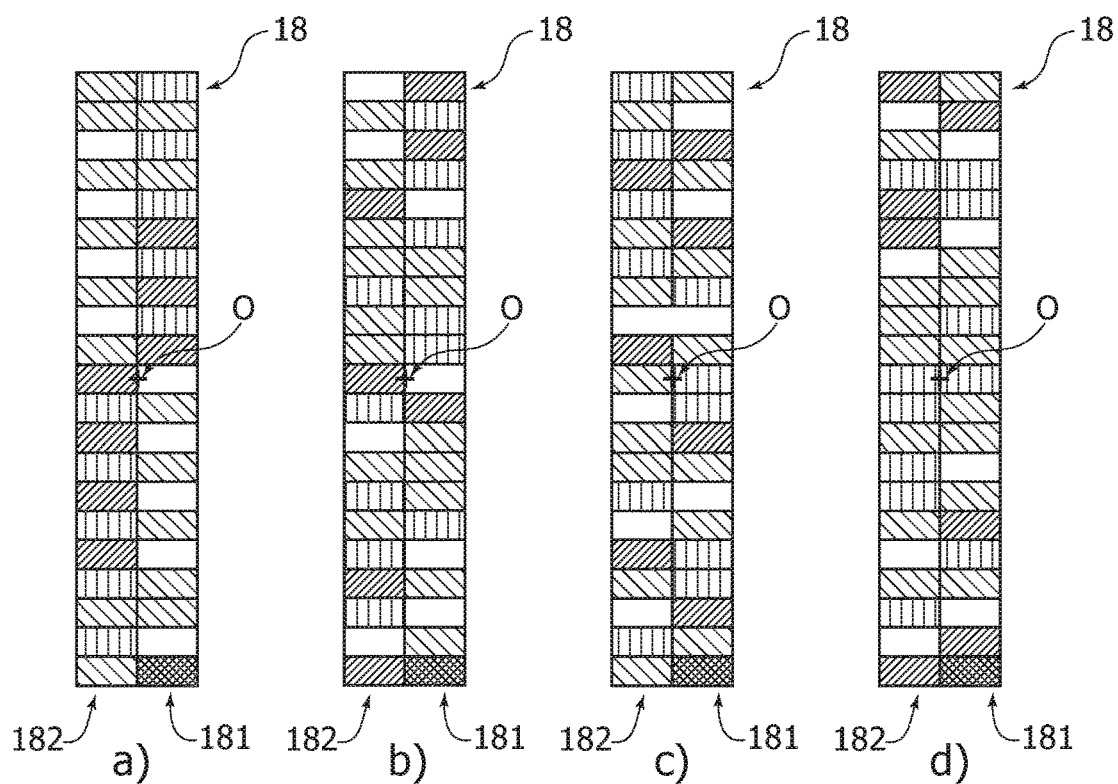

Regarding the choice of the parameters $l_1$ and $l_2$ it has been observed that:
- the possible choice $l_1 \neq 0$ and $l_2 = 0$ leads to placing LEDs of the same colour all at the centre of the array (as exemplified, for example, in part a) of FIG. 5),
- the possible choice of $l_1 = 0$ and $l_2 \neq 0$ leads instead to placing LEDs of the same colour at the end regions of the array (i.e. in a remote position with respect to the centre of the array, as seen in the example of part d) of FIG. 5).

The fact of choosing intermediate values between 0 and 1 for $l_1$ and $l_2$ can lead to results such as those exemplified in parts b) and c) of FIG. 5, which are able to satisfy the previously discussed criteria (homocentric sets or groups; "partial" fractions in the sub-arrays that reflect the "total" fractions; asymmetry of the sub-arrays), which therefore do not identify a single distribution per se.

In one or more embodiments, the procedure exemplified in FIG. 6 can be repeated with different values for $l_1$ and $l_2$, comparing the different results obtained in relation to the uniformity of colour and illuminance (also as a function of the power level or "wattage", spectrum, number of LEDs used, driving currents) being able, therefore, to choose a solution that can be considered more suitable for the application or usage needs, for example, of the type exemplified in FIG. 4.

In this regard, it will be appreciated that one or more embodiments can be used in the presence of a number of sets of different coloured sources different from the number of four sets (blue, red, deep red and white) exemplified here. Even the choice of colours exemplified here is not to be considered imperative.

For example, one or more embodiments may envisage the use of different light radiation sources from those previously exemplified both regarding the number (for example, six sources instead of four), and regarding the choice of specific emission wavelengths (e.g. with blue colour sources at 460 nm and/or 470 nm, and red sources at 625 nm, 660 nm and/or 730 nm).

One or more embodiments may envisage the use of light radiation sources emitting in the ultraviolet field (e.g. UV-A) and/or in the infrared field. This can give rise to "empty points" (or pre-assigned) in the mechanism for assigning positions of the sources operating in the visible sector.

The light radiation sources can be supplied (according to known criteria) continuously or with a variable current (for example, with a pulse width modulation scheme) so as to be able, for example, to vary the overall intensity levels or the individual sets (e.g. according to circadian cycles with simulation, possibly accelerated, of the diurnal solar cycle).

One or more embodiments can be used in a network context, for example, by exploiting databases in which information on lighting cycles ("recipes") is stored, for example, in an Internet of Things (IoT) context or for computing purposes on the cloud.

One or more embodiments are suitable to be connected (for example, at the control device level D) to a user interface (GUI) with the possibility of use in plant growth simulation programs as well, with the use of viewers and systems of augmented or virtual reality.

A lighting device (e.g. 18) according to one or more embodiments may comprise a planar array (e.g. 180, 181, 182) of electrically-powered light radiation sources (e.g. LEDs) partitioned in a plurality of sets of light radiation sources, wherein the light radiation sources of the same set emit light radiation of the same colour and different sets of light radiation sources in the plurality of sets of light radiation sources emit light radiation of different colours, wherein:
- the array comprises a total number (e.g. N) of light radiation sources with each one of the different sets of light radiation sources in the plurality of sets of light radiation sources comprising a respective fraction (e.g. N1/N, N2/N, N3/N, N4/N) of the total number of light radiation sources in the array,
- the light radiation sources in said planar array have respective planar coordinates (e.g. $x_i$, $y_i$) with respect to a common centre (e.g. O) of the array, with the different sets of light radiation sources in the plurality of sets of light radiation sources having respective centres located at (i.e. at least approximately coinciding with) the common centre of the array,
- the array comprises at least two complementary sub-arrays (e.g. 181, 182) (i.e. which together form the array) of light radiation sources, the sub-arrays being mutually opposite (i.e. lying on opposite sides or bands) with respect to said common centre (see, for example, the two rows or lines 181, 182 of FIG. 2 or the two columns 181, 182 of FIG. 3), wherein the different sets of light radiation sources in the plurality of sets of light radiation source are present in said sub-arrays in respective partial fractions (for example, 7/20 and 8/21; 4/20 and 3/21; 5/20 and 6/21; 4/20 and 4/21) of the number of radiation sources included in the sub-array,
- for each one of the different sets of light radiation sources in the plurality of sets of light radiation sources, said respective partial fractions in the sub-arrays reflect the respective fraction of the total number of light radiation sources in the array.

The expression "reflect" indicates (in a synthetic way) the fact that, for each of the different sets of light radiation sources (e.g. red, blue, deep red and white), the aforesaid respective partial fractions in the sub-arrays can be substantially or approximately i) equal to each other and ii) equal to the respective fraction of the total number of sources, that is, referring to the example presented here (which is the following):
- 7/20≈8/21≈15/41 for the LEDs emitting red radiation,
- 4/20≈3/21≈7/41 for the LEDs emitting blue radiation,
- 5/20≈6/21≈11/41 for the LEDs emitting deep red radiation,
- 4/2≈4/21≈8/41 for the LEDs emitting white (cold) radiation.

In one or more embodiments, the light radiation sources comprised in said at least two sub-arrays can be distributed asymmetrically (e.g. with reference to a specular symmetry) with respect to the common centre (O) of the array.

In one or more embodiments, said different sets of light radiation sources in the plurality of sets of light radiation sources can emit light radiation of colours selected from red, blue and white, optionally cold white.

One or more embodiments may comprise a control device (e.g. D) configured (e.g. DS) to selectively de-activate the sets of light radiation sources emitting blue and red colour radiation while maintaining the light radiation sources in the set emitting white light radiation active.

In one or more embodiments, the light radiation sources may comprise LED sources.

In one or more embodiments, an installation (10), e.g. for horticultural applications, may comprise:
- a lighting space between a lighted plane (e.g. S) and a lighting plane (e.g. 12) parallel to the lighted plane, and
- a lighting device according to one or more embodiments arranged at the lighting plane centrally with respect to the lighted plane for projecting light radiation towards the lighted plane in the direction of a radiation emission axis extending from the lighting plane towards the lighted plane.

One or more embodiments may relate to a method for distributing—in a planar array—electrically-powered light radiation sources partitioned in a plurality of sets of light radiation sources, wherein:
- the light radiation sources of the same set emit light radiation of the same colour and different sets of light radiation sources in the plurality of sets of light radiation sources emit light radiation of different colours, wherein:
- the array comprises a total number of light radiation sources with each one of the different sets of light radiation sources in the plurality of sets of light radiation sources comprising a respective fraction of the total number of light radiation sources in the array,
- the light radiation sources in said planar array have respective planar coordinates with respect to a common centre of the array, The method comprises:
- distributing the light radiation sources in the different sets of light radiation sources in the plurality of sets of light radiation sources with respective centres located at the common centre of the array,
- partitioning the array into at least two complementary sub-arrays of light radiation sources, the sub-arrays being mutually opposite with respect to said common centre, wherein the different sets of light radiation sources in the plurality of sets of light radiation sources are present in said sub-arrays with respective partial fractions of the number of light radiation sources included in the sub-array,
- partitioning the light radiation sources for each one of the different sets of light radiation sources in the plurality of sets of light radiation sources with said respective partial fractions in the sub-arrays reflecting (see previous discussion) the respective fraction of the total number of light radiation sources in the array.

One or more embodiments may envisage distributing the light radiation sources in said at least two sub-arrays asymmetrically with respect to the common centre of the array.

Without prejudice to the underlying principles of the invention, the details of construction and the embodiments may vary, even significantly, with respect to those illustrated here, purely by way of non-limiting example, without departing from the scope of the invention.

The field of protection is determined by the attached claims.

LIST OF REFERENCE SIGNS

Installation 10
Lighting plane 12
Main sides 141
Minor sides 142
Back wall 16
Lighted plane S
Distance H
Plants P
Drive unit D
Sensor DS
Lighting device 18
Light radiation sources 180, 181, 182
Array (planar) 180
Sub-arrays 181, 182
Planar coordinates x, y
Array centre O
Determination of array characteristics 100
Study/analysis of source characteristics 102
Identifying number of sources 104
Choice of locations 106
Filling some table positions 108
Colour choice 110
Filling first free position 112
Calculation of values and magnitudes 114
Verifying completion of free positions 116
Choice/assignment of position with lowest F value 118
Full colour sequence scan verification 120

The invention claimed is:
1. A lighting device comprising:
a planar array of light radiation sources partitioned in a plurality of sets of light radiation sources, wherein a same set of the light radiation sources emit light radiation of a same color, and wherein different sets of light radiation sources in the plurality of sets of light radiation sources emit light radiation of different colors,
wherein:
the array comprises a total number of light radiation sources with each set of light radiation sources in the plurality of sets of light radiation sources comprising a respective fraction of the total number of light radiation sources in the array,
the light radiation sources in said planar array have respective planar coordinates with respect to a common center of the array, with the different sets of light radiation sources in the plurality of sets of light radiation sources having respective center located at the common center of the array,
the array comprises at least two complementary sub-arrays of light radiation sources, the sub-arrays mutually opposed with respect to said common center, wherein the different sets of light radiation sources in the plurality of sets of light radiation sources are present in said sub-arrays with respective partial fractions of the number of light radiation sources included in the sub-array,
for each different set of light radiation sources in the plurality of sets of light radiation sources said respec- tive partial fractions in the sub-arrays mirror the respective fraction of the total number of light radiation sources in the array, and wherein each sub-array of the at least two complementary sub-arrays comprises a different number of light radiation sources from each further sub-array of the at least two complementary sub-arrays.

2. The lighting device of claim 1, wherein the light radiation sources included in said at least two sub-arrays are distributed asymmetrically with respect to the common center of the array; wherein the light radiation sources distributed in said at least two sub-arrays are asymmetric in that one or more forms of symmetry is lacking from the following group comprising specular symmetry, rotational symmetry, or translational symmetry with respect to the common center of the array.

3. The lighting device of claim 1, wherein said different sets of light radiation sources in the plurality of sets of light radiation sources emit light radiation with colors selected from red, blue, or white.

4. The lighting device of claim 3, further comprising a control device configured to selectively de-activate the sets of light radiation sources emitting blue and red color radiation while maintaining activated light radiation sources in the set emitting white light radiation.

5. The lighting device of claim 1, wherein the light radiation sources comprise LED sources.

6. An installation comprising:
a lighting space between a lighted plane and a lighting plane parallel to the lighted plane, and
a lighting device according to claim 1 arranged at the lighting plane centrally of the lighted plane and projecting light radiation towards the lighted plane in the direction of a radiation emission axis extending from the lighting plane towards the lighted plane.

7. The lighting device of claim 1, wherein each sub-array of the at least two complementary sub-arrays is arranged as a row or column side-by-side with each further sub-array of the at least two complementary sub-arrays.

8. The lighting device of claim 1, wherein each set of the plurality of sets of light radiation sources emits light radiation at a temperature ranging from 5600K to 6500K.

9. The lighting device of claim 1, wherein at least two sets of the plurality of sets of light radiation sources comprise a different number of light radiation sources to emit light of a same color.

10. The lighting device of claim 1, wherein each sub-array of the at least two complementary sub-arrays is arranged as a row or column side-by-side with each further sub-array of the at least two complementary sub-arrays.

11. A method of distributing in a planar array electrically-powered light radiation sources partitioned in a plurality of sets of light radiation sources, wherein:
the light radiation sources in a same set emit light radiation of a same color and different sets of light radiation sources in the plurality of sets of light radiation sources emit light radiation of different colors, wherein:
the array comprises a total number of light radiation sources with each one of the different sets of light radiation sources in the plurality of sets of light radiation sources comprising a respective fraction of the total number of light radiation sources in the array,
the light radiation sources in said planar array have respective planar coordinates with respect to a common center of the array, and each sub-array of the at least two complementary sub-arrays comprises a different number of light radiation sources from each further sub-array of the at least two complementary sub-arrays, wherein the method comprises:
distributing the light radiation sources in the different sets of light radiation sources in the plurality of sets of light radiation sources with respective centers located at the common center of the array,
partitioning the array into at least two complementary sub-arrays of light radiation sources, wherein the sub-arrays are mutually opposed with respect to said common center, wherein the different sets of light radiation sources in the plurality of sets of light radiation sources are present in said sub-arrays with a respective partial fraction of the number of light radiation sources included in the sub-array,
partitioning the light radiation sources for each one of the different sets of light radiation sources in the plurality of sets of light radiation sources with said respective partial fractions in the sub-arrays mirroring the respective fraction of the total number of light radiation sources in the array.

12. The method of claim 11, further comprising distributing the light radiation sources in said at least two sub-arrays asymmetrically with respect to the common center of the array; wherein the light radiation sources distributed in said at least two sub-arrays are asymmetric in that one or more forms of symmetry is lacking from the following group comprising specular symmetry, rotational symmetry, or translational symmetry with respect to the common center of the array.

13. The lighting device of claim 11, wherein each set of the plurality of sets of light radiation sources emits light radiation at a temperature ranging from 5600K to 6500K.

14. The lighting device of claim 11, wherein at least two sets of the plurality of sets of light radiation sources comprises a different number of light radiation sources to emit light of a same color.

15. The method of claim 11, wherein at least two of the different sets of light radiation sources in the plurality of sets of light radiation sources are present in said sub-arrays with different respective partial fractions of the number of light radiation sources included in the sub-array.

16. A lighting device comprising:
a planar array of light radiation sources partitioned in a plurality of sets of light radiation sources, wherein a same set of the light radiation sources emit light radiation of a same color, and wherein different sets of light radiation sources in the plurality of sets of light radiation sources emit light radiation of different colors, wherein:
the array comprises a total number of light radiation sources with each set of light radiation sources in the plurality of sets of light radiation sources comprising a respective fraction of the total number of light radiation sources in the array,
the light radiation sources in said planar array have respective planar coordinates with respect to a common center of the array, with the different sets of light radiation sources in the plurality of sets of light radiation sources having respective center located at the common center of the array,
the array comprises at least two complementary sub-arrays of light radiation sources, the sub-arrays mutually opposed with respect to said common center, wherein at least two sets of the different sets of light radiation sources in the plurality of sets of light radiation sources are present in said sub-arrays with different respective partial fractions of the number of light radiation sources included in the sub-array, for each different set of light radiation sources in the plurality of sets of light radiation sources said respective partial fractions in the sub-arrays mirror the respective fraction of the total number of light radiation sources in the array.

* * * * *